Patented Nov. 25, 1930

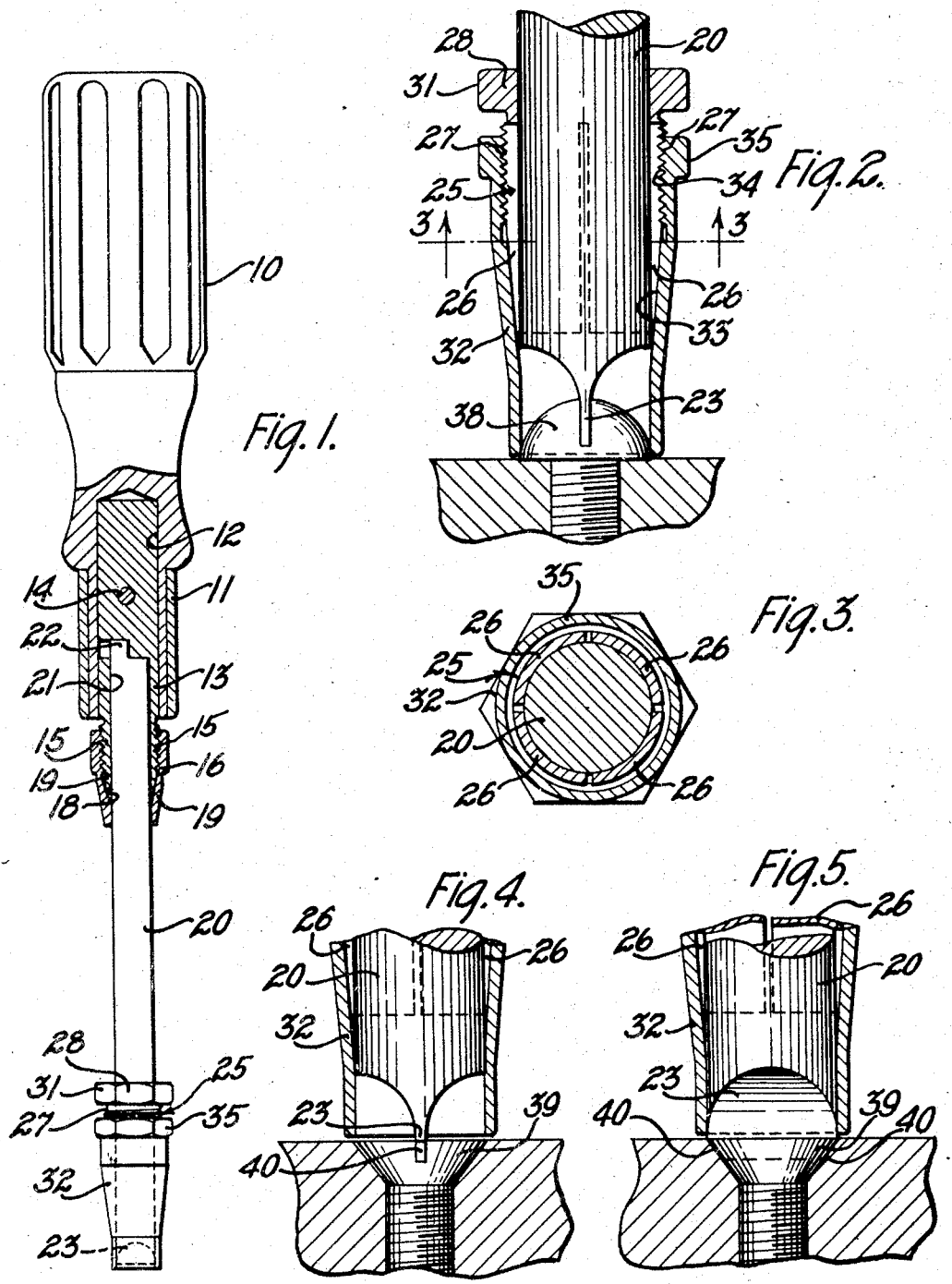

1,782,448

UNITED STATES PATENT OFFICE

SAMUEL FRANCIS SHORT, OF LA GRANGE, ILLINOIS, ASSIGNOR TO WESTERN ELECTRIC COMPANY, INCORPORATED, OF NEW YORK, N. Y., A CORPORATION OF NEW YORK

GUARDING AND GUIDING ATTACHMENT FOR TOOLS

Application filed November 15, 1926. Serial No. 148,393.

This invention relates to guarding and guiding attachments for tools, and more particularly to a guarding and guiding attachment for rotatable tools.

In rotatable tools, such as manually operable screw driving tools for instance, it is desirable in forming an operative connection with a round headed screw to guide the tang of the screw driver blade into axial alignment within the transverse slot of the screw and during a rotation thereof to guard against lateral movement therebetween to prevent injury to adjacent surfaces of the work in which the screw is being rotated to the tool, to the screw or to the operator, which might possibly result from such a movement.

The primary object of this invention is to provide a simple and inexpensive attachment for the hereinbefore described purpose which may be readily, adjustably and positively attached in operative position upon a tool.

In accordance with the general features of this invention there is provided in one embodiment thereof, as applied to a blade of a manually operable screw driving tool, a sleeve adapted to receive the tang of the blade and the head of the screw to be operated, a spring jaw chuck surrounding the blade and having a threaded engagement with the sleeve being provided for adjustably and positively attaching the guarding and guiding sleeve in a predetermined operative position upon the blade.

Other objects and advantages of this invention will more fully appear from the accompanying detailed description taken in connection with the accompanying drawings, in which Fig. 1 is a view, partly in section, of a manually operable tool holder carrying a screw driving blade having a guard embodying the features of this invention, operatively attached thereto;

Fig. 2 is an enlarged fragmentary view thereof, partly in vertical section, showing the combined guard and guide and the tang of the blade in operative position with respect to a round headed screw;

Fig. 3 is a section on the line 3—3 thereof;

Fig. 4 is a view similar to Fig. 2 showing the lower end of the guard and the tang of the blade in operative position with respect to a countersunk flat headed screw, the tang being slightly modified, and Fig. 5 is a side view thereof.

Referring to the drawings, particularly to Fig. 1 wherein a manually operable tool holder is illustrated, the numeral 10 represents a handle, preferably of wood, which is shouldered at one end to receive a metal ferrule 11. The ferruled end of the handle is provided with a bore 12 for the reception of the shank of a multi-spring jaw chuck 13, which with the ferrule 11 is secured against relative rotation within the handle 10 by a pin 14 extending through all three members. The chuck 13 at its outer end is slotted to form a plurality of jaws 15 provided with external screw threads for engaging interior threads formed in a sleeve 16, the sleeve having a hexagonal shaped exterior surface upon an enlarged end thereof to facilitate the threading thereof onto the jaws 15. The sleeve 16 is provided with an internal tapered circular surface 18 adapted to engage a shouldered unthreaded portion 19 of each of the jaws 15 to contract the latter sufficiently to clamp a tool, in the present instance a screw driving blade 20, against longitudinal displacement within a bore 21 of the chuck 13. The inner end of the blade 20 extending into the bore 21 of the chuck 13 is provided with a tongue 22 which extends into a notch formed in the shank of the chuck at the inner end of the bore thereof, thus providing means for securing the blade against relative rotation upon the chuck when rotating a screw. The operative end of the blade 20 is beveled from opposite sides to form a tang 23 (Fig. 2) for insertion in the usual transverse slot formed in screw heads, that portion of the blade intermediate the tongue 22 and the tang being circular and uniform in cross-section throughout its length.

Upon the operative end of the blade 20 is a chuck 25 provided with four spring jaws 26, screw threaded as indicated at 27 upon their upper exterior surfaces and integrally connected together by a sleeve portion 28 (Fig. 2), the internal diameter of which is such that it is freely slidable upon the blade when the jaws are not contracted into gripping engagement with the peripheral surface of the blade, the jaws being tapered toward their free ends upon their external surfaces. The exterior surface of the portion 28 of the chuck 25 is hexagon shaped as indicated by the numeral 31 for the purpose of facilitating the rotation of the chuck when contracting the jaws 26 in a manner to be described hereinafter. Surrounding the periphery of the chuck 25 for the greater portion of its length is a guard and guide in the form of a sleeve 32 provided with an internally tapered surface 33 intermediate its ends and with internal screw threads 34 at its upper end (Fig. 2) for engagement with the threads 27 upon the jaws 26 of the chuck. The upper end of the sleeve 32 is also provided with a hexagon shaped exterior surface 35, the purpose of which will be made apparent hereinafter. The extreme free end of the sleeve 32 is tapered upon its exterior surface but is not tapered upon its internal surface, the internal diameter thereof being sufficient to permit the blade 20 to pass freely therethrough and also to receive the head of the particular screw with which it is to be operatively associated, as clearly indicated in Fig. 2.

In using the guard hereinbefore described in connection with a round headed screw 38 (Fig. 2), the sleeve 32 is adjusted longitudinally upon the screw driving blade 20 until its lower annular surface is slightly above the bottom surface of the screw head and with the tang 23 positioned at the bottom of the slot formed in the head of the screw. In this position of the guard and guide upon the blade 20, the lower annular surface of the sleeve 32 will not engage the surface against which the bottom surface of the screw head rests when the screw is in its full securing position. When the guard is thus correctly positioned it is securely and positively retained thereat by the contraction of the jaw 26 against the peripheral surface of the blade 20. This is accomplished in the following manner: The hexagon shaped end 35 of the sleeve 32 is gripped is a vise or other suitable means adapted to hold it stationary while the hexagon shaped end 31 of the chuck 25 affords a grip for a wrench or other means whereby the chuck may be threaded into the sleeve 32, the internally tapered surface 33 of the sleeve causing a contraction of the clutch jaws 26 against the periphery of the blade 20 as the tapered surfaces of the jaws move therealong and thus positively clamp the sleeve in a definite operative position and in such a manner that it cannot be accidentally displaced. As thus assembled and in actual use it will be apparent that upon bringing the tang 23 of the screw driving blade 20 into operative relation with the slot of the screw, the sleeve 32 which extends from the tang and is of substantially the same diameter as the head of the screw will serve to guide the latter into axial alignment within the slot of the screw and during the rotation thereof prevent any lateral movement therebetween which would cause the tang to become displaced from the slot and possibly injuring adjacent surfaces of the work in which the screw is being rotated, the tool, the screw or the operator.

Figs. 4 and 5 illustrate the use of the guard and guide in connection with a countersunk flat headed screw 39. Although the sleeve 32 in this instance does not serve to actually prevent lateral movement between the tang 23 and the screw slot, it does tend to minimize injury to surrounding surfaces, the tool or the operator as will be apparent, due to the greater area of the sleeve 32 as compared to the comparatively sharp end surface of the tang. The tang of the blade 20, as illustrated in connection with the screw 39, has been beveled upon opposite ends as indicated at 40 for the purpose of completely engaging the parallel spaced walls of the screw slot, thus providing a maximum bearing surface.

Although the invention has been illustrated and described in connection with a manually operable screw driving tool, it will be understood that it may be applied equally well to power driven screw driving mechanisms and also to other types of tools wherein an operative end of the tool is to engage a complemental formation of an article.

What is claimed is:

1. In combination with a screwdriver having a tang and a blade of constant cross-section, a threaded sleeve normally slidable on the blade and provided with a resilient extension positioned adjacent the blade, and a guard having an upper portion threadedly engaging the sleeve, a lower portion having its inner diameter substantially equal to the width of the tang and designed to surround the tang to provide a guard and guide therefor, and an intermediate portion having a tapered inner surface designed to force the extension into fixed frictional engagement with the blade when the guard is moved longitudinally of the sleeve, said surface tapering to a smaller diameter than that of the blade of the screw-driver so as to bind on the end thereof and limit the upward adjustment of the guard.

2. In combination with a screw-driver having a blade of constant cross-section terminating in a tang, a threaded sleeve normally slidable on the blade and provided with a resilient extension positioned adjacent the blade, and a guard having threaded engagement with the sleeve and provided with a portion designed to surround the tang of the screw-driver and also provided with a tapered portion designed to contact with the extension and bring it into fixed frictional engagement with the blade upon rotation of the guard relative to the sleeve, said surface tapering to a smaller diameter than that of the blade of the screw-driver so as to bind on the end thereof and limit the upward adjustment of the guard.

In witness whereof, I hereunto subscribe my name this 29th day of Oct. A. D., 1926.

SAMUEL FRANCIS SHORT.